United States Patent
Beringer et al.

(10) Patent No.: US 7,403,989 B2
(45) Date of Patent: Jul. 22, 2008

(54) FACILITATING IMPROVED WORKFLOW

(75) Inventors: Joerg Beringer, Frankfurt (DE); Peer Hilgers, Germany (DE); Leif Jensen-Pistorius, Oestringen (DE); Klaus Wriessnegger, Heidelberg (DE)

(73) Assignee: SAP AG, Walldorf (DE)

( * ) Notice: Subject to any disclaimer, the term of this patent is extended or adjusted under 35 U.S.C. 154(b) by 809 days.

(21) Appl. No.: 10/306,783

(22) Filed: Nov. 27, 2002

(65) Prior Publication Data
US 2003/0154232 A1  Aug. 14, 2003

(30) Foreign Application Priority Data
Jan. 8, 2002  (EP) .................. 02000485

(51) Int. Cl.
*G06F 15/173* (2006.01)
(52) U.S. Cl. ............... 709/223; 709/203; 709/217; 708/102; 705/9; 705/10
(58) Field of Classification Search ........... 709/203, 709/217–219, 223; 718/102; 705/9–10
See application file for complete search history.

(56) References Cited

U.S. PATENT DOCUMENTS

| | | | |
|---|---|---|---|
| 5,911,143 A | 6/1999 | Deinhart et al. | |
| 5,949,866 A | 9/1999 | Coiera et al. | |
| 6,014,666 A | 1/2000 | Helland et al. | |
| 6,055,637 A | 4/2000 | Hudson et al. | |
| 6,073,242 A | 6/2000 | Hardy et al. | |
| 6,412,073 B1* | 6/2002 | Rangan | 705/14 |
| 6,598,046 B1* | 7/2003 | Goldberg et al. | 707/5 |
| 6,647,396 B2* | 11/2003 | Parnell et al. | 707/102 |
| 6,721,782 B1* | 4/2004 | Fariborz et al. | 709/204 |
| 6,842,782 B1* | 1/2005 | Malik et al. | 709/217 |
| 6,859,823 B1* | 2/2005 | Nishihara et al. | 709/203 |
| 7,007,280 B1* | 2/2006 | Dermer | 719/316 |
| 2002/0007300 A1* | 1/2002 | Slatter | 705/9 |
| 2002/0111824 A1* | 8/2002 | Grainger | 705/1 |
| 2002/0174010 A1* | 11/2002 | Rice, III. | 705/14 |
| 2003/0078830 A1* | 4/2003 | Wagner et al. | 705/10 |

FOREIGN PATENT DOCUMENTS

| | | |
|---|---|---|
| DE | 10025990 A1 | 10/2001 |
| EP | 1065615 A2 | 1/2001 |
| EP | 0697662 B1 | 5/2001 |
| EP | 1158444 A1 | 11/2001 |

(Continued)

OTHER PUBLICATIONS

PCT Communication and International Search Report, mailed Jul. 15, 2004 (8 pages).

(Continued)

*Primary Examiner*—Philip B Tran
(74) *Attorney, Agent, or Firm*—Finnegan, Henderson, Farabow, Garrett & Dunner, L.L.P.

(57) ABSTRACT

Systems and techniques to improve workflow using worksets. In general, in one implementation, the technique includes: providing a data object directed to a particular work role. The data object includes task data for performing the work role, portal environment data for presenting information to a user via a portal, and meta-data descriptive of the work role.

27 Claims, 11 Drawing Sheets

FOREIGN PATENT DOCUMENTS

| | | |
|---|---|---|
| WO | WO 01/33392 A2 | 5/2001 |
| WO | WO 01/67285 A2 | 9/2001 |
| WO | WO 01/81829 A1 | 11/2001 |
| WO | WO 01/90945 A2 | 11/2001 |
| WO | WO 01/97073 A | 12/2001 |
| WO | WO 02/01388 A | 1/2002 |

OTHER PUBLICATIONS

European Search Report from the European Patent Office dated Jun. 18, 2007 for European Application No. EP 03 72 9305 (6 pages).

"mySAP.com Workplace 2.0 Smart Implementation," Aug. 2000 (18 pages).

"mySAP.com Workplace Enterprise Portal: Applications, Information and Services," (23 pages), no date.

Anind Dey et al., "Cyberdesk: A Framework for Providing Self-Integrating Context-Aware Services," 1998 International Conference on Intelligent User Interfaces, IUI San Francisco, CA, ACM, Jan. 6, 1998, (pp. 47-54).

Understanding Portals, "A Business Person's Guide to Enterprise Portal Terms and Business Impacts" (77 pages), no date.

* cited by examiner

FACILITATING IMPROVED WORKFLOW

CROSS REFERENCE TO RELATED APPLICATIONS

This application claims the benefit of priority from European Patent Application No. 02000485.9, filed Jan. 8, 2002, entitled "Providing Web Page for Executing Tasks by User, With Data Object," the disclosure of which is incorporated by reference in its entirety.

BACKGROUND

The following description relates to data processing, for example, systems and techniques for improving workflow by processing data.

Portal computing systems combine disparate resources into an integrated interface. Users interact with the resources via user interface elements on portal pages, which may be embodied in web browser windows. Portal systems allow a user to view and interact with information and tools from a wide variety of sources such as word processing programs, spreadsheet programs, databases, and other sources.

Portal computing systems can improve workflow by allowing workers to more easily access resources and information needed to perform their jobs. For example, role-based portal systems strive to improve workflow by providing user interfaces that allow a worker with a particular job role to access data and resources usually associated with the particular job role. A role-based portal system may provide a number of pre-defined roles, where the included resources and information represent the developer's "best guess" of the resources needed to perform each particular job role. For example, in a role-based portal system, an executive role may include resources that enable the user to access company-wide strategic information such as competitive analyses and profitability forecasts. A manager role may include resources for project management and/or people management. A developer role may include software development tools.

However, role-based portal systems may not accurately reflect the particular work goals of particular users. For example, two different managers may have different responsibilities associated with particular work goals, and so need to access a different set of resources and information. A single pre-defined role cannot typically meet the needs of both managers: it would tend either to lack some useful resources, or to include extraneous resources.

The ability of a role-based system to accurately reflect users' work goals may be improved by adding more granularity in the type of roles represented. For example, rather than having a single "manager" role, a role-based system may include a product manager role, a sales manager role, an engineering manager role, and so on.

SUMMARY

In one aspect, a data object includes task data for performing a work role, portal environment data to present information to a user via a portal, and meta-data descriptive of the work role. The task data may include data associated with one or more application programs, documents, and/or life and work events for performing the work role.

The portal environment data may include navigation data, view data, and page data for performing the work role. The view data may include Iview data.

The meta-data may include community data, collaboration data, context data, workset description data, job role data, subscription data, taxonomy data, user data, and search domain data. The meta-data may include data for populating a generic portal page with content.

The data object may be assigned to a user profile for a portal user. At least some meta-data from the data object may be copied to the user profile. The copied meta-data may be used to personalize the user's portal environment. Personalization may include, e.g., activating a subscription for the user, activating a membership in a community for the user, and/or displaying personalized information to the user.

The data object may be created as a result of obtaining employee work practice information, grouping the employee work practice information according to work role, and creating the data object to include task data for performing the work role. Creating the data object may also include associating meta-data with the data object and/or associating portal environment data with the data object. At least some meta-data may be assigned to the data object from a job role or user profile. One or more overview pages may be provided for the data object. The data object may be assigned to one or more user profiles. At least some meta-data from the data object may be transported to the user profile.

In general, in one aspect, a user interface is provided. The user interface includes a search area for searching for workset information, a work area for viewing workset information (e.g., one or more services associated with a particular workset), and an assignment area for assigning workset data to a user. The work area may facilitate modifying workset information. The work area may include a workset detail area.

In general, in one aspect, one or more data objects directed to particular work goals may be generated. The data objects may be assigned to user profiles associated with users having the work goal. Each of the data objects may be used to generate a portal page including content for achieving the work goal. The portal page may include an integrated view. Each of the data objects may include task data for achieving the particular work goal, and generated portal pages may include user interface elements associated with the task data.

In general, in one aspect, a first portal page may be displayed to a portal user, where first portal page includes user interface elements for accessing content related to a plurality of work roles. The first portal page may include overview information for one or more of the particular work roles. The first portal page may include user interface elements for accessing one or more generic portal pages.

A second portal page may be displayed in response to selection of a user interface element associated with a particular work role, where the second portal page includes user interface elements associated with the particular work role. The second portal page may include overview information for the particular work role, user interface elements for performing tasks associated with the particular work role, and/or status information associated with the particular work role.

The systems and techniques described here may provide one or more of the following advantages. A workset-based portal system may increase employees' efficiency by integrating needed resources according to particular work intents and related work goals. Worksets may be used to provide specified content to users, where the content is related to the work goal of the workset. Once a set of worksets has been developed, they may be used to design workspaces for other employees (such as new hires) based on the expected employee responsibility.

As stated above, the ability of role-based systems to reflect users' work goals may be improved by adding more granularity to the type of roles represented. However, doing so adds to the development time and cost of the role-based system.

Also, since it is common for the work goals of one job role to overlap with the work goals of others, a significant amount of duplicative effort may be required. Finally, since a user's work goals may shift over time, such a role-based system may be impractical in terms of upgrade and maintenance costs.

In contrast, the current systems and techniques provide the advantage that worksets directly reflect particular work goals. Therefore, rather than duplicating effort in developing new roles, particular worksets may be assigned to multiple users. Further, if a user's work goals shift, he may be assigned a new workset rather than an entire new role.

Details of one or more implementations are set forth in the accompanying drawings and the description below. Other features and advantages may be apparent from the description and drawings, and from the claims.

DRAWING DESCRIPTION

These and other aspects will now be described in detail with reference to the following drawings.

Like reference symbols in the various drawings indicate like elements.

DETAILED DESCRIPTION

Figure 1:
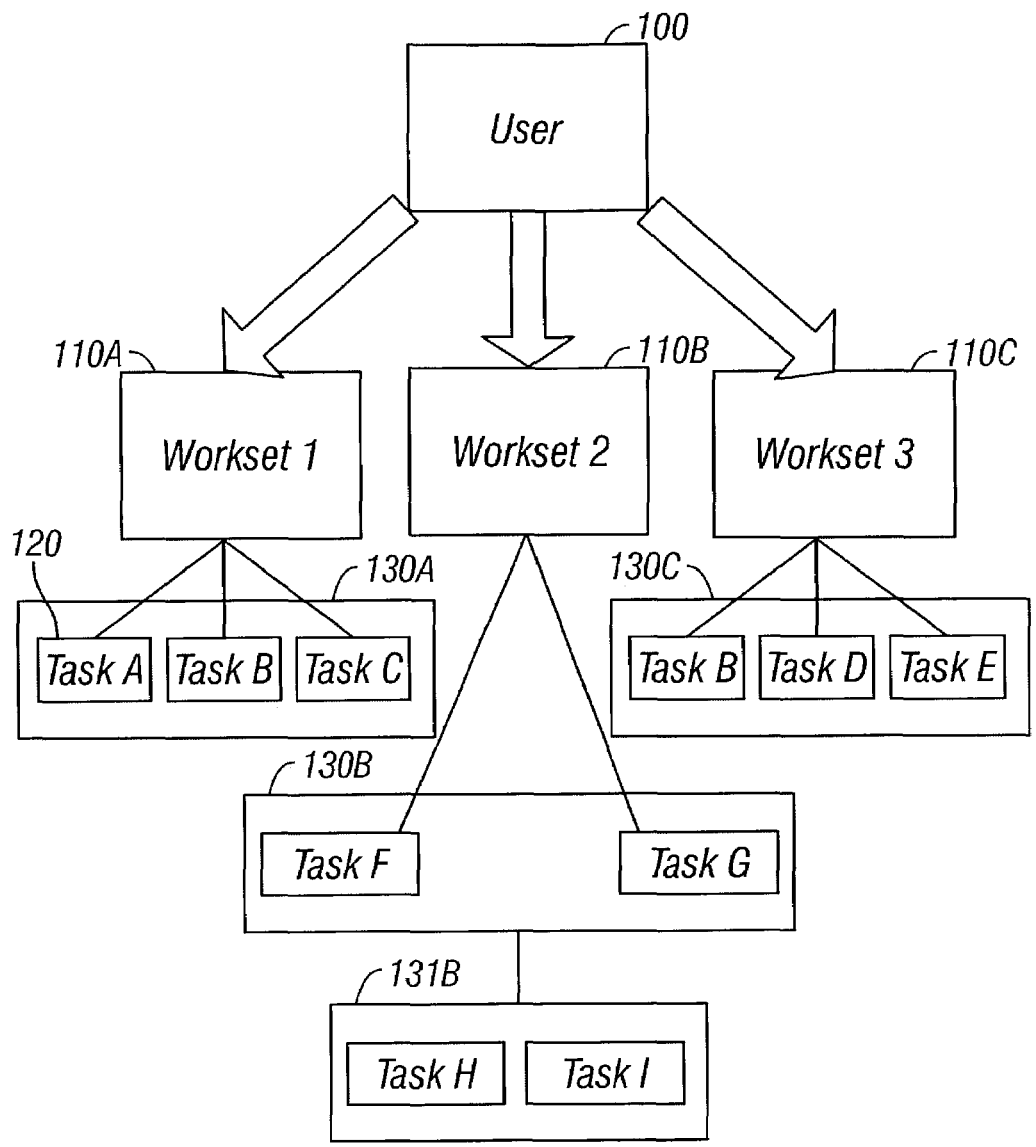
FIG. 1 illustrates the semantic structure of a workset-based portal system.

The systems and techniques described here relate to data processing for improved workflow.

Workflow refers to the tasks that an employee performs, as well as the manner in which the tasks are performed. For many employees, workflow includes accessing one or more application programs via the employee's computer, providing data for the one or more applications programs, and processing data. For example, a sales manager may access one or more competitor web sites using an Internet browser, view a display including product data such as price, and store and/or process competitor product data using another application program such as a spreadsheet program. Workflow is efficient when a user can access needed information and resources with minimal effort. Workflow is inefficient when a user must spend time finding and/or switching among particular information and resources.

Portal systems may improve a user's ability to access information and resources. However, role-based portal systems that seek to present standardized sets of tasks for particular roles are generally not flexible enough to accurately model a user's actual work intent, and thus do not provide optimally efficient workflow for a user.

The following terms are used to describe various aspects of the current disclosure:

"Job role" refers to a user's job title. Manager, engineer, and administrator are examples of job roles.

"Work role" refers to a coherent set of tasks and responsibilities directed to achieving a particular work goal.

"Work intent" refers to a user's intent in performing one or more tasks. For example, a user's work intent may be to develop a budget.

"Work goal" refers to the goal associated with the user's work intent. For example, if the user's work intent is to develop a budget, the work goal may be a completed budget.

"Workset" refers to one or more data objects including content for achieving a particular work goal or small set of work goals. For example, when the work goal is a completed budget, the workset may include content such as a budget spreadsheet program, as well as the portal environment for presenting content to the user. Worksets may include additional elements, as described below.

"Task" refers to an item of portal content assigned to a workset. Tasks may be associated with other tasks; for example, a first-level task may be associated with one or more second-level tasks, which may in turn be associated with third-level tasks.

The present techniques and systems provide workset-based portal systems to enable more efficient workflow. Worksets-based portal systems present a user with workspaces that are targeted to the user's specific work intents and/or dominant activities, rather than providing a comprehensive list of tasks for a particular job role. In a workset-based portal system, a workspace is a portal page or part of a portal page supporting a coherent set of tasks.

A workset-based portal system is based on the recognition that a user with a particular job role performs a number of different work roles, where each work role consists of a number of tasks directed at achieving a particular work goal. For example, a sales manager (job role) may perform various different work roles related to budgeting, team leading, key account management, promotion management, and market watching. Each of the work roles involves performing one or more tasks.

In order to enable an employee such as a sales manager to perform his work roles, and thus his job role, efficiently, a workset is developed for each work role. The workset includes the tasks and corresponding portal environment for performing the particular work role, which may be bundled into one manageable data object. The workset thus reflects the user's work intent rather than stereotypical job titles, standard business objects, or business processes.

In some implementations, each workset defines a complete working environment for a given work role using a hybrid collection of elements including tools, information, communication and collaboration features, and user interface requirements. These elements may include a navigation structure; visual components such as views (e.g., "Iviews" or "integrated views" referring to a basic unit of portal content that can be used to display information or interact with the portal user) and pages; information and application services; work artifacts such as business objects, procedures, interest profiles, and subscription rules; and collaborative elements.

A workset may include data related to some or all of the following elements: communities (communities that associated users may want to participate in), context information (information about attributes associated with the workset; for example, attributes that users associated with the workset typically would have), description (brief description of the work intent/work goal of the workset), information/resource collection (one or more bodies of information that associated users may use as resources for achieving the work goal), name (a human-understandable name for the workset), job roles (job roles typically associated with the workset; when a job role is assigned to a particular user, he may be associated with all worksets typically associated with the job role), subscriptions (e.g., a list of resource objects the user may want to subscribe to), navigation structure (the navigation structure provided by the workset, to be combined with other navigation structures including those provided by any other assigned worksets to produce a navigation structure for the particular workset-based portal user), taxonomies (e.g. particular classifications the user may be interested in), and users (users associated with the workset; by including user data in a workset data object, notification tasks may be associated with the workset, and users associated with the workset may receive the notification).

To link worksets with content management, a workset may include pre-defined search domains. When a user performs a search via a workspace associated with the workset, the search would include the pre-defined search domains. In some implementations, the user may be provided with a choice of search domains.

Some portal-based systems provide tasks organized in life and work events, where the life and work events model a work sequence; for example, according to best practices. A life and work event portal system is described in pending U.S. patent application Ser. No. 10/137,212, filed Apr. 30, 2002, entitled "Processing Life and Work Events," inventors Botscheck et al., which is incorporated by reference in its entirety. A workset may include such a work sequence.

Worksets may include meta-data that may be used for personalization of portal content for the particular user. For example, worksets may include meta-data chosen from a corporate taxonomy of interests. For example, a product support engineer may be assigned a customer feedback workset including tasks related to customer feedback for a particular customer. Meta-data associated with the workset may include an industry identifier for the particular customer chosen from the corporate taxonomy.

The meta-data may be used in a number of ways. For example, the product support engineer may automatically be made a member of an interest-based community for that particular industry. The meta-data may be used to activate a subscription. For example, the user may automatically subscribe to policy documents related to the customer service workset once he is associated with the workset.

Worksets can be an important source of context meta-data for personalization of a user's portal environment. Each workset may have associated context meta-data such as a stereotypical profile for a user assigned to the workset. The context data could include information such as skills, licenses, expertise, and education of a typical user to whom the workset is assigned. When the workset is assigned to an actual user, the associated context data may be assigned to his user profile. The context data may then be used to personalize the user's portal environment. For example, particular content may be pushed to the user as a result of the personalization. As mentioned above, one or more subscriptions and/or one or more memberships in a community may be activated based on context meta-data. By associating context data with particular worksets, the effort required to personalize portal environments for users may be significantly reduced.

Worksets may include state-less and/or state-full information or services. State-less content is generally directed to portal services and user interface elements. An example of a state-less service is a particular application that may be used to perform a task. For example, a state-less service may be a spreadsheet program for developing a budget. Worksets including state-less content may be used to deploy targeted content to portal users.

In contrast, a state-full service is one that represents the current state of a working process. For example, instantiated content (e.g., a particular instance of a spreadsheet program with a budget for a particular department on a particular date) is state-full rather than state-less. Examples of state-full content include: current artifacts that have been created (e.g., business objects, procedures, interest profiles, and subscription rules), folders and taxonomies that have been created, the current state of a workset (when a lifecycle is defined for the workset), a current collaborative network in terms of contacts and teams, and current team or project work.

Worksets including state-full content may be used to transfer a current work state from one user to another. For example, when a new sales manager replaces an existing sales manager, state-full content such as personal or collaborative project work, instantiated work events, and other content may be provided to the new sales manager via the workset-based portal system. State-full content can also serve as a template for creating similar worksets (for example, for creating team rooms).

Users interact with worksets via one or more workspaces (e.g. portal pages or portions of portal pages) including user-interface elements. A workspace is a spatial arrangement of services and information that together support a coherent set of tasks. Each workset includes user-interface elements associated with that workset and that are displayed in the workspace for enabling tasks associated with the workset. A workspace can include a number of components, which may include integrated views (Iviews), for presenting content to the user. A workspace may include structured information (e.g. applications) and unstructured information, may offer social experience (e.g., users may share opinions, interact with other users via a chat function, share lessons learned, and may determine how many users have accessed particular workspaces), and may offer direct access to related actions or information.

FIG. 1 shows the relationship between a user's job role, assigned worksets, tasks, and workspaces. A user 100 has a job role which generally describes his overall work responsibilities. Typical job roles include manager, engineer, developer, sales person, administrator, etc.

Worksets 110A, 110B, and 110C are associated with three different work roles of the user. The worksets include tasks that enable the user to perform the work role. Workset 110A includes a number of tasks 120, such as tasks A, B, and C, which are presented to the user on a workspace 130A. Workset 110B includes tasks F and G, which are presented to the user on a workspace 130B. Tasks H and I may be second-level tasks associated with first-level tasks F and/or G, or may be first-level tasks presented in workspace 131B for clarity's sake. Workset 110B also includes tasks H and I, which are presented to the user on a workspace 131B. Workset 110C includes tasks B, D, and E, which are presented to the user on a workspace 130C. For example, workspace 130A may include on or more Iviews on a portal page.

A particular component such as a task presented on a particular Iview may be presented on more than one workspace. For example, a particular task may be relevant to two different worksets assigned to a user. Rather than associating the task with only one workset (e.g., to avoid duplication), it may be associated with both worksets so that the user does not have to switch among workspaces to access that particular task. Referring to FIG. 1, task B is included in both workset 110A and in workset 110C, and may be presented to the user on both workspace 130A and workspace 130C.

The workspace may include a menu structure such as a two-level tab structure. The menu structure enables the user to quickly find the desired task or service. For example, the first level tabs may provide access to generic portal pages such as a home page, as well as workspaces associated with worksets. The second level tabs may provide access to tasks and sub-tasks associated with the corresponding portal page.

Figure 2:
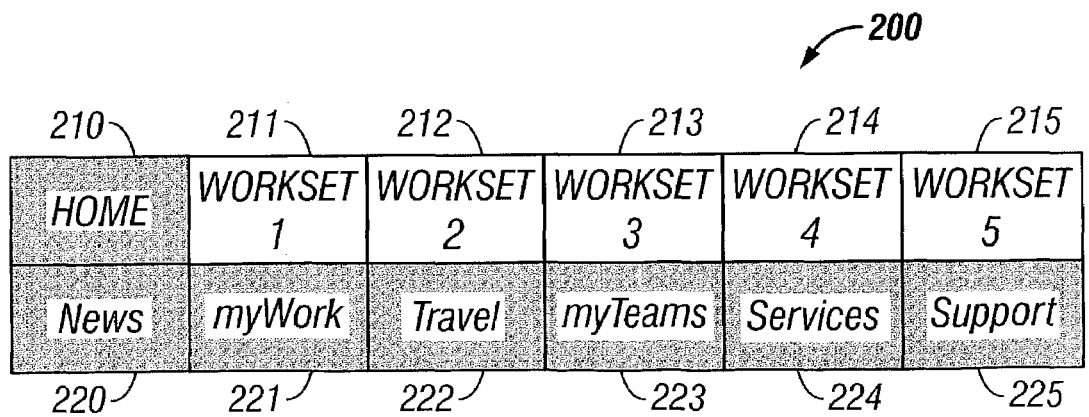
FIG. 2 shows a two-level tab structure for accessing worksets, generic portal pages, and associated tasks.

FIG. 2 shows a two-level tab structure 200 that may be used for navigation among workspaces associated with generic portal pages, worksets, and tasks. First level tab 210 corresponds to a home page. Corresponding second-level tabs include a news tab 220, a myWork tab 221, a travel tab 222, a myTeams tab 223, a services tab 224, and a support tab 225. First level tabs 211-215 correspond to worksets 1-5, which may each have corresponding second-level tabs directed to tasks for performing the work role of the workset.

For some worksets, there may be services that are relevant to the workset but are better presented to the user in via a generic portal page rather than a workspace associated with the particular workset. For example, Workset 1 of FIG. 2 may be a customer service workset, and may be associated with a travel task. However, a travel task may better be presented to the user on a generic portal page such as the home page associated with upper-level tab 210, since travel is associated with many different types of worksets across a number of different job roles. Therefore, Workset 1 of FIG. 2 may populate the travel task associated with second-level tab 222 with travel-related content rather presenting travel-related content on a workspace associated with Workset 1. Similarly, a workset may be associated with a particular news task (e.g., industry news), which may be better presented on a generic portal page, such as a news page associated with second-level tab 220 of FIG. 2. Alternately, the content may be presented on multiple pages, such as a portal page associated with the workset, as well as a generic portal page.

When a workset populates a generic portal page with content, the content may include additional components, or additional content for a component already associated with a generic portal page. For example, a component such as a travel task may be added to a generic portal page such as a home page. Additionally, content may be added to a component already associated with the generic portal page (e.g., a particular contact may be added to a contact list already associated with a home page or other page).

A workset may populate content to generic portal pages in a number of ways. For example, nodes may be added to generic navigation structures such as a home page structure via navigation merging. The workset then may define only the fragment that is to be added, using predefined identifiers as upper nodes. The port then merges the fragments into a single navigation entry based on the identifiers. Alternately, an application program interface (API) may be defined to add content to one or more generic portal pages. For example, an API may be used to add content associated with particular collections (such as collections of business objects, contacts, communities, reports, search domains, etc.) to particular portal pages.

Worksets may include elements such as services, flags, and meta data to support collaboration among portal users. Supported collaboration tools may include shared spaces such as team rooms, and communication tools such as web meetings. Worksets may also support community spaces and conversation channels. For example, worksets may support activity-based communities (e.g., all software designers), or strategic communities spanning a number of different job roles.

Collaborative spaces may be included in workspaces associated with particular worksets, or on more generic portal pages. For example, a Workset 1 of FIG. 2 may include a web meeting task. User interface elements related to the web meeting task may be presented to the user on a workspace related to Workset 1, or on a more generic portal page such as a myWork page associated with second-level tab 221 of FIG. 2.

In general, a workset-based portal system typically should provide worksets associated with a large area of responsibility which can also be considered as an embedded work role (that is, a subset of the user's job role). A workset may be a small but reasonable chunk of work that would be assigned to a person, which includes tasks performed by some job roles but not others. A user's assigned worksets should reflect the user's different work intents directed to different work roles. By providing worksets to performing different work roles, the system reduces the amount of time the user spends searching for particular resources and switching among portal pages.

In contrast, a workset-based portal system that splits coherent work across multiple worksets may result in decreased efficiency. If a user is switching among worksets too frequently, the portal design may not accurately model his optimum workflow and may need to be altered. In such a case, the worksets may be reflecting a technical (backend) concept or application model rather than particular work goals. By designing worksets from the outside in (that is, by optimizing the workspace based on the user rather than on a particular service or application), self-referential structures that reflect an implementation model or traditional business object can be avoided.

A set of worksets may be developed by obtaining information about employee work practices. The information may be obtained by interviewing employees about their particular job goals and the information and resources they use during their work day. Additionally, data related to the employee's computer use, phone user, interaction with others (e.g., meeting data), and other data may be used to develop worksets.

Figure 3:
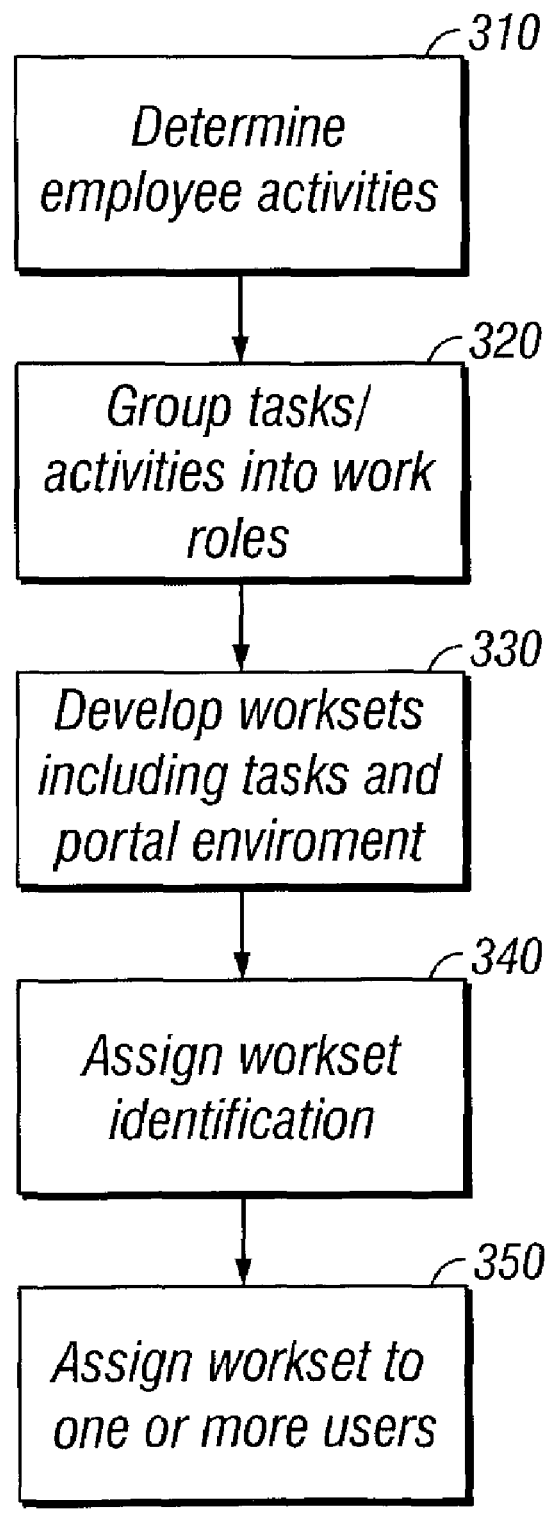
FIG. 3 is a flow chart showing a process for developing content for a workset-based portal system.

Referring to FIG. 3, worksets may be developed by obtaining work-related data for one or more employees. For example, worksets may be developed by determining the tasks or actions that employees take while at work (310). This determination may be made by interviewing employees and by collecting data about employee activities (e.g., by collecting data related to employee computer use, employee phone use, employee interaction with other employees, and other data related to the employee's activities while at work).

After the employee tasks have been determined, they may be grouped in work roles (320), where the tasks in a particular work role are directed to a goal or a number of related work goals of the work role. The tasks for a particular work role may be grouped in a number of levels, for ease of access and use. For example, a work role may include first-, second-, and third-level tasks, etc (or alternately, tasks, sub-tasks, sub-sub-tasks, etc.).

Once an employee's work roles are determined, a workset is developed for each work role, including the tasks associated with the work role, and the portal environment (330). As stated above, a workset may be implemented as a single data object with the elements needed to provide access to information and resources for achieving the work goal or goals. The workset may be labeled with an expression that reflects the goal or goals (340). The workset may be assigned to the employee, as well as other users of the workset-based portal system (350). Worksets may be assigned to a specified user by adding the worksets to a user profile for the specified user.

A workset-based portal system may be directed to a particular business or industry. In order to develop worksets for a particular business, the following methods may be used. The development team may evaluate the overall information system scenario for the business in order to understand the applications, services, and information a workset-based portal system will be presenting to users.

In order to develop an effective system, the development team may endeavor to understand the company's overall business goals and needs (the company's "big picture"). The development team may ascertain which employees will potentially be users of the portal system, the reasons they may need to use the system, and the benefits the portal system will provide for those business and the users.

Once an understanding of the overall business environment is obtained, the developers gather information on particular work intents and work roles of potential users. Developers may interview potential users on-site, and observe them as they work. Alternately, developers may obtain user information remotely; for example, by conducting phone or email interviews, and by obtaining data related to the user's computer use.

Interviews help the developer learn about what is important to the user during the course of performing the user's work roles. For example, a potential user interview may include questions such as:

Who or what triggers your activities?

Do you depend on information from outside sources for your work, and if so, what are the sources?

What kind of information, tips, or advice do you get from others?

Who needs to be informed about the state of your work?

Who else might be interested in what you are doing right now?

Who receives the results of your work?

What information, tips, or advice do others seek from you?

What external or internal information resources do you use?

What information or types of information are difficult for you to find?

Is there any information that typically arrives later than you would like it to arrives?

What information, tips, or advice do you typically get from informal talks with your colleagues?

Additionally, a developer may review the potential user's email habits. For incoming emails, the developer may determine:

From whom is the user receiving emails, and what is the topic?

Who is on the cc: list for the emails?

From whom and why is the user receiving forwarded emails?

What "FYI" emails does the user receive, and why?

For outgoing emails, the developer may determine:

What emails have you sent to more than one recipient, and why?

What emails have you forwarded?

What distribution lists do you use?

Do you have your own list of contacts? If so, how are they organized?

The developer may also determine how the user manages content by ascertaining:

Where and using what structure does the user store his files?

What shared services does the user access?

In which domains is the user searching to access information and services?

Additionally, the developer may obtain information related to how the user analyzes accessed information. For example, the developer may ask questions such as:

How do you monitor your business goals?

What key figures are important for you?

What dimensions are important for you?

How far do you drill down?

What related information would be useful to understand the data?

How do you recognize trends?

The developer may also obtain information related to the user's personal interests. For example, the developer may ask the user:

What kind of training are you interested in?

What web sites do you visit for personal reasons?

Do you have a personalized web page; for example, a personalized Yahoo! Web page?

Are you a member of any newsgroups?

Do you subscribe to any information providers?

Additionally, the developer may ask general questions, such as:

How do you know that everything is going well at work?

What would be a really bad day for you?

If there were a magic portal, what would it be able to do?

If you were traveling, what information would you miss?

These questions are only examples of the types of questions and data gathering that may be used to develop a workset-based portal system. Different or additional questions may be used to achieve the desired results.

After user data is acquired, it is used to build the workset-based portal system. For particular users, the developers use the data to determine the user's responsibilities (work goals) and related tasks (work roles). The developers determine both the workflow and the informal information flow.

Figure 4:
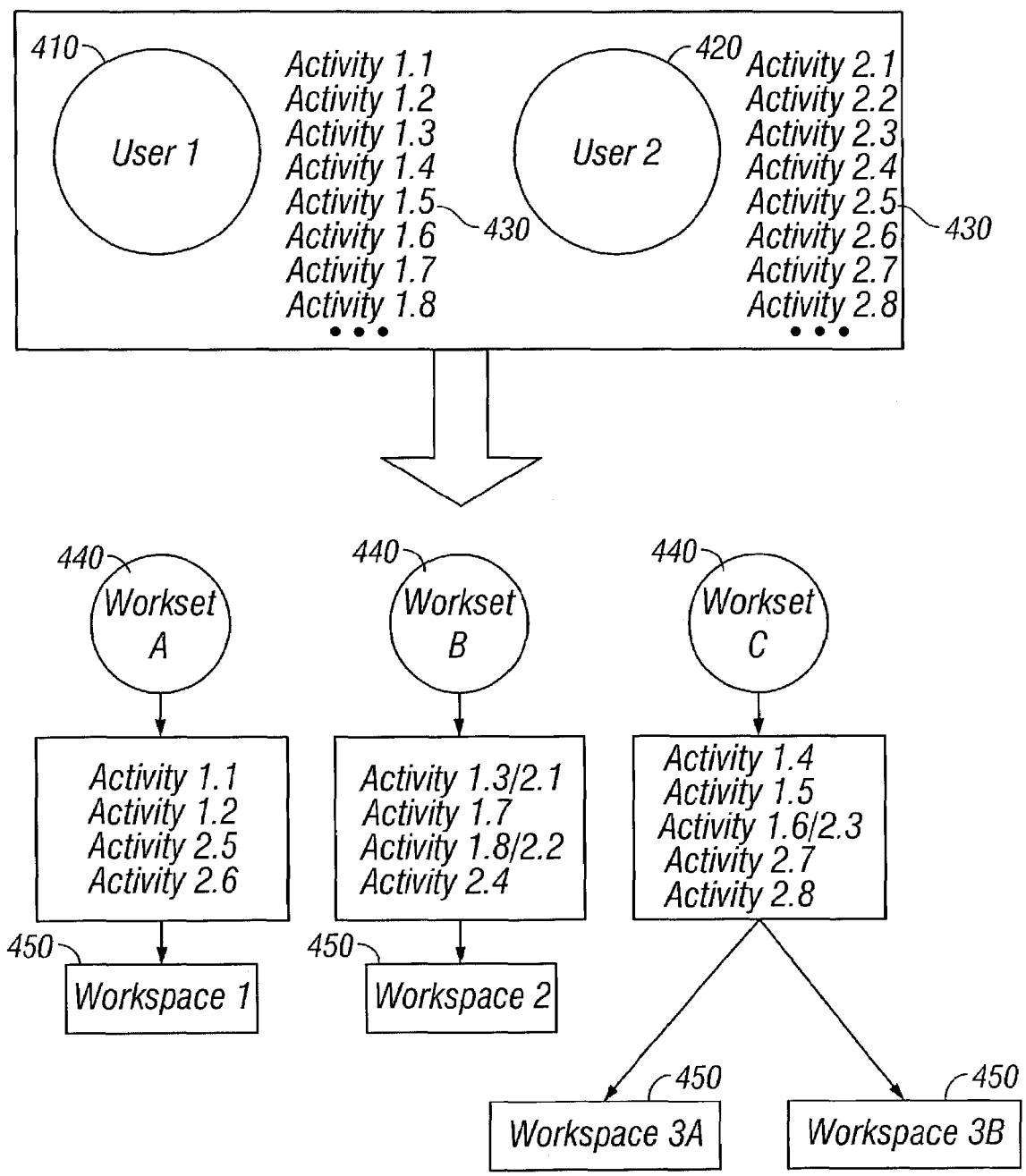
FIG. 4 illustrates clustering content into worksets for presentation on workspaces.

Once data has been collected, the developers create substructures that group the content according to the employee's work intent for performing particular work roles. The content for a work role (or a set of related work roles) is used to build the workset. Referring to FIG. 4, a first user 410 and a second user 420 perform a number of tasks 430. The tasks can be simple or complex; they may include a large or small set of services, or may correspond to a single interaction step. The workset developer groups the tasks into worksets such as worksets 440, according to the particular work goal of the grouped tasks. Worksets 440 include portal environment information as well as task information. In FIG. 4, the tasks have been grouped into three worksets 440: Workset A, Workset B, and Workset C.

In addition to grouping content by work role, the developers endeavor to present the optimum amount of content in a workspace: the workspace should present maximum functionality while staying focused on the particular workset or task. The amount or presentation of content presented to user in a workspace should not be visually or intellectually overwhelming. For example, in FIG. 4, Workset A and Workset B each present tasks to a user via a single workspace 450. However, Workset C presents tasks to a user using two workspaces 450, to avoid overwhelming the user by presenting a workspace with too many tasks.

Some worksets may be dominated by certain types of activities, such as searching, monitoring, dispatching, collecting, problem solving, etc. The types of activities offered in a workspace may influence the design of the workspace. Workspace design may be analogized to apartment design: workspaces may be optimized for certain activities in the same way that rooms in an apartment are optimized for certain activities (e.g., a kitchen is optimized for cooking, a dining room is optimized for eating, etc.).

The workset developers may also build collaborative structure for the user and others. The developers determine the groups and teams the user belongs to, the user's personal networks, and other collaborative activities. The developers may define communities to include users or activities that have a common theme.

Figure 5:
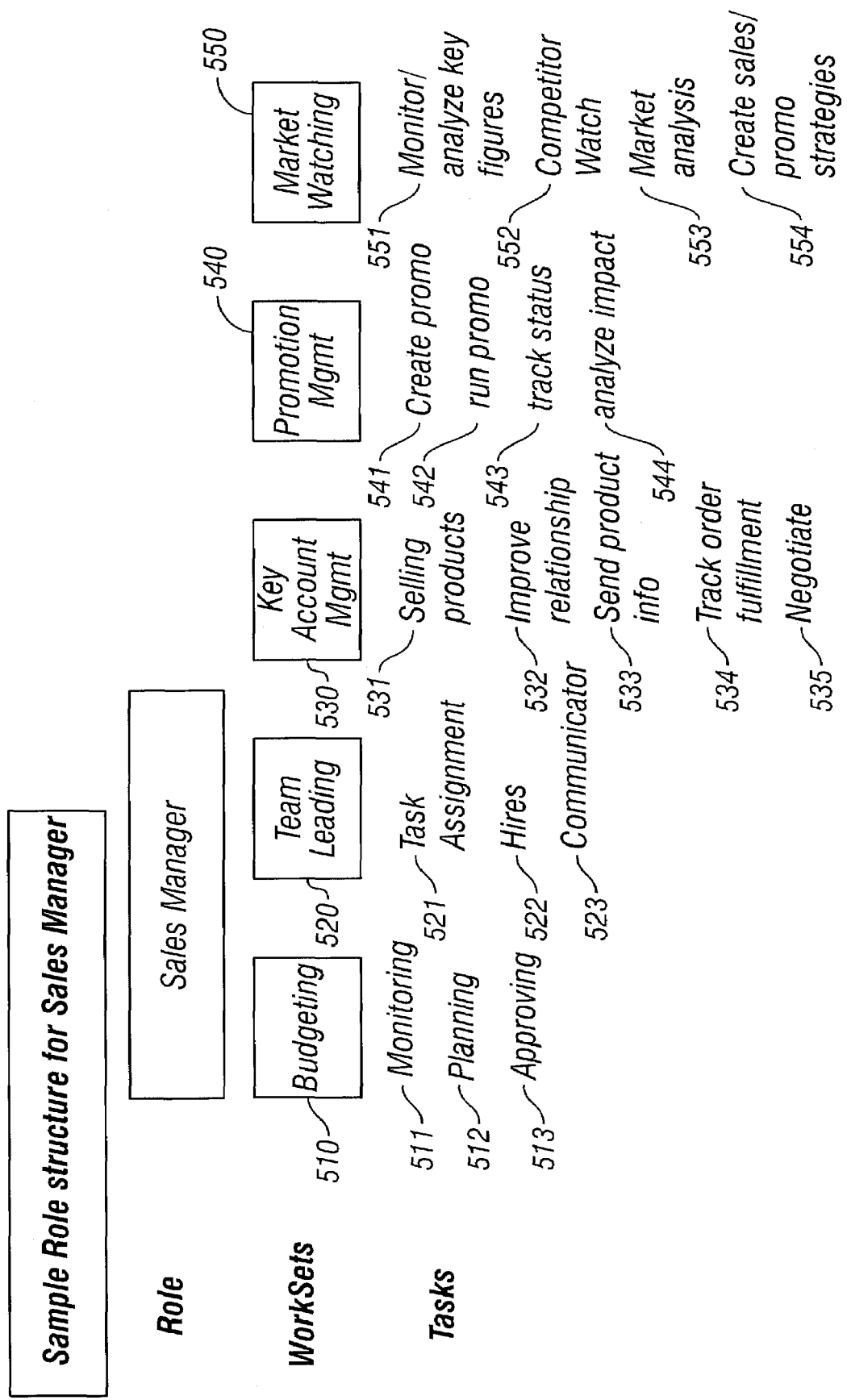
FIG. 5 shows worksets and associated tasks for a user with a job role of sales manager.

FIG. 5 shows how tasks are grouped into worksets for a user whose job role is sales manager. The assigned worksets may be developed by interviewing the user or using other data acquisition methods to determine his work roles and related tasks, and/or may be existing worksets that are assigned to the sales manager based on his current or projected work roles. Each workset is directed to one or more work roles of the sales manager, and may be given a name describing the particular work role of the workset. In FIG. 5, the user is associated with the worksets budgeting (510), team leading (520), key account management (530), promotion management (540), and market watching (550).

Referring to FIG. 5, budgeting (510) is associated with second-level tasks monitoring (511), planning (512), and approving (513). Team leading (520) is associated with task assignment (521), hiring (522), and communicating (523). Key account management (530) is associated with selling products (531), improving relationships (532), sending product information (533), tracking order fulfillment (534), and negotiation (535). Promotion management (540) is associated with create promotions (541), run promotions (542), track status (543), and analyze impact (544). Market watching (550) is associated with monitoring/analyzing key figures (551), watching competitors (552), market analysis (553), and creating sales/promotion strategies (554).

The grouping of tasks to a particular workset may differ from company to company and even across a particular company. For example, for a particular company, a budgeting workset may include monitoring (511), planning (512), and approving (513) tasks, while for a different company, a budgeting workset may include only planning and approving tasks, while monitoring tasks may be part of a different workset.

Figure 6:
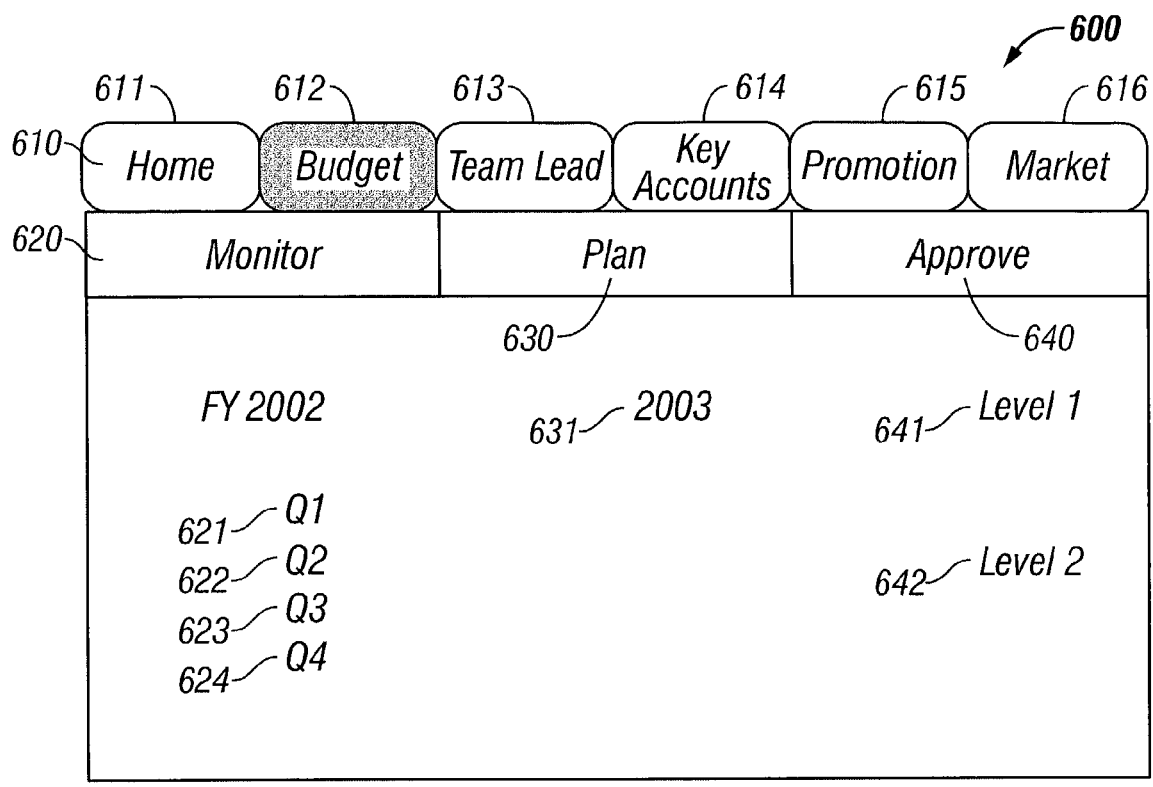
FIG. 6 is a representation of a workspace page for a user with a job role of sales manager.

A workspace including user interface elements for one or more worksets may be presented to an employee. For example, the workspace may be a portal page that the user may access using an Internet browser. Referring to FIG. 6, a workspace 600 for a sales manager includes a two-level tab structure 610 including first-level tabs for a home page 611, a budget management workset 612, a team lead workset 613, an account management workset 614, a promotion management workset 615, and a market watch workset 616. The tabs in tab structure 610 allow the user to navigate among a number of different worksets and generic portal content. Workspace 600 is designed so that the sales manager can efficiently access those resources needed to fulfill his job responsibilities. By providing a structure such as that of workspace 600, the sales manager may work more efficiently.

Workspace 600 shows the first- and second-level tasks presented when the user chooses budget management tab 612. A monitor task 620, a plan task 630, and an approve task 640 associated with the budget management workset are presented on workspace 600.

Workspace 600 shows second-level tasks associated with the first-level tasks. Second-level tasks "Monitor Q1" 621, "Monitor Q2" 622, "Monitor Q3" 623, and "Monitor Q4" 624 are associated with monitor task 620. A second-level task "Plan 2003" 631 is associated with first-level plan task 630. A second-level "Level 1" approval task 641 and a second-level "Level 2" approval task 642 are associated with approve task 640. Second-level tasks are presented on workspace 600 with the associated first-level tasks for ease of navigation, but need not be presented on workspace 600. That is, workspace 600 may present more or fewer task levels than shown.

Figure 7:
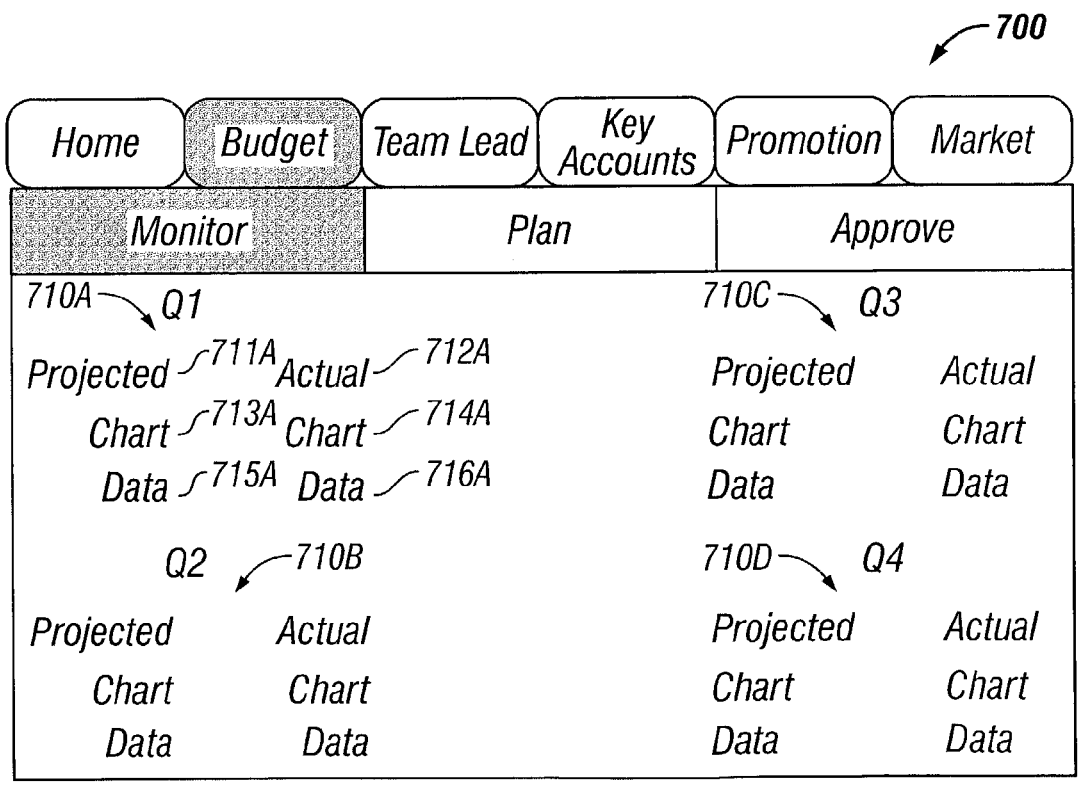
FIG. 7 is a representation of a monitor task page for a budget workset.

Referring to FIG. 7, upon selecting the "monitor" task, a workspace such as a monitor task page 700 may be presented to the user. Monitor task page 700 includes a page area 710A with a presentation of second-level task monitor Q1, as well as six third-level tasks. A user may select a projected task 711A to view a projected budget for Q1. A user may select an actual task 712A to view actual spending for Q1. A user may select a chart task 713A to view a chart of projected spending for Q1, or a chart task 714A to view a chart of actual spending for Q1. A user may select a data task 715A to access data related to projected spending for Q1, or a data task 716A to access data related to actual spending for Q1.

A user may access tasks in a page area 710B for Q2 budget information, may access tasks in a page area 710C for Q3 budget information, and may access tasks in a page area 710D for Q4 budget information.

Figure 8:
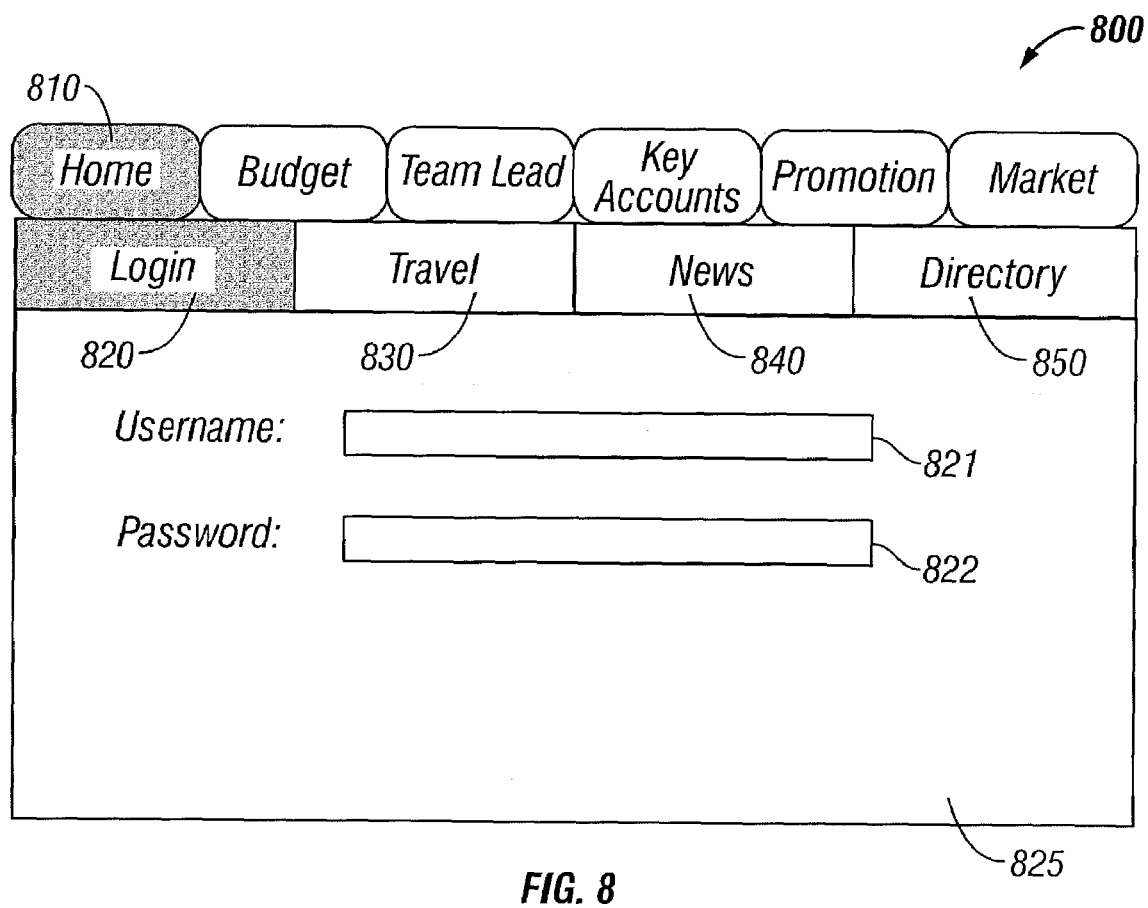
FIG. 8 is a representation of a home page and an associated login task.

Referring to FIG. 8, a workspace 800 may include a home page 810, including second level tabs for generic tasks. For example, home page 810 includes second-level tabs for a login task 820, a travel task 830, a news task 840, and a directory task 850. A page area 825 of workspace 800 includes a username field 821 and a password field 822, associated with login task 820. In other implementations, login may not be required or may be performed differently.

In some implementations, when an employee's workflow includes tasks from a particular workset, other worksets and/or tasks may be assigned to the employee. For example, when an employee such as a sales manager is associated with a "budget" workset, a subscription to a company finance policy may be automatically activated. In another example, when an employee such as a sales manager is associated with a "market watch" workset, a subscription to an industry news service may automatically be activated. The subscription task may be presented on a workspace with the appropriate workset (e.g., the finance policy task may be presented on the workspace including tasks associated with the "budget" workset), or may be presented in another appropriate manner (e.g., the industry news service task may be presented on a news page). The presentation may be determined manually or automatically.

In order to assign worksets to new or existing users, create new worksets, and/or modify content of existing worksets, a system of workset-based content administration may be used. Worksets may be chosen from a content repository (e.g., one or more databases), then assigned to new or existing users. A particular workset may be modified prior to assigning the workset to a user. New worksets may be created, using content from existing worksets or other content.

Figure 9:
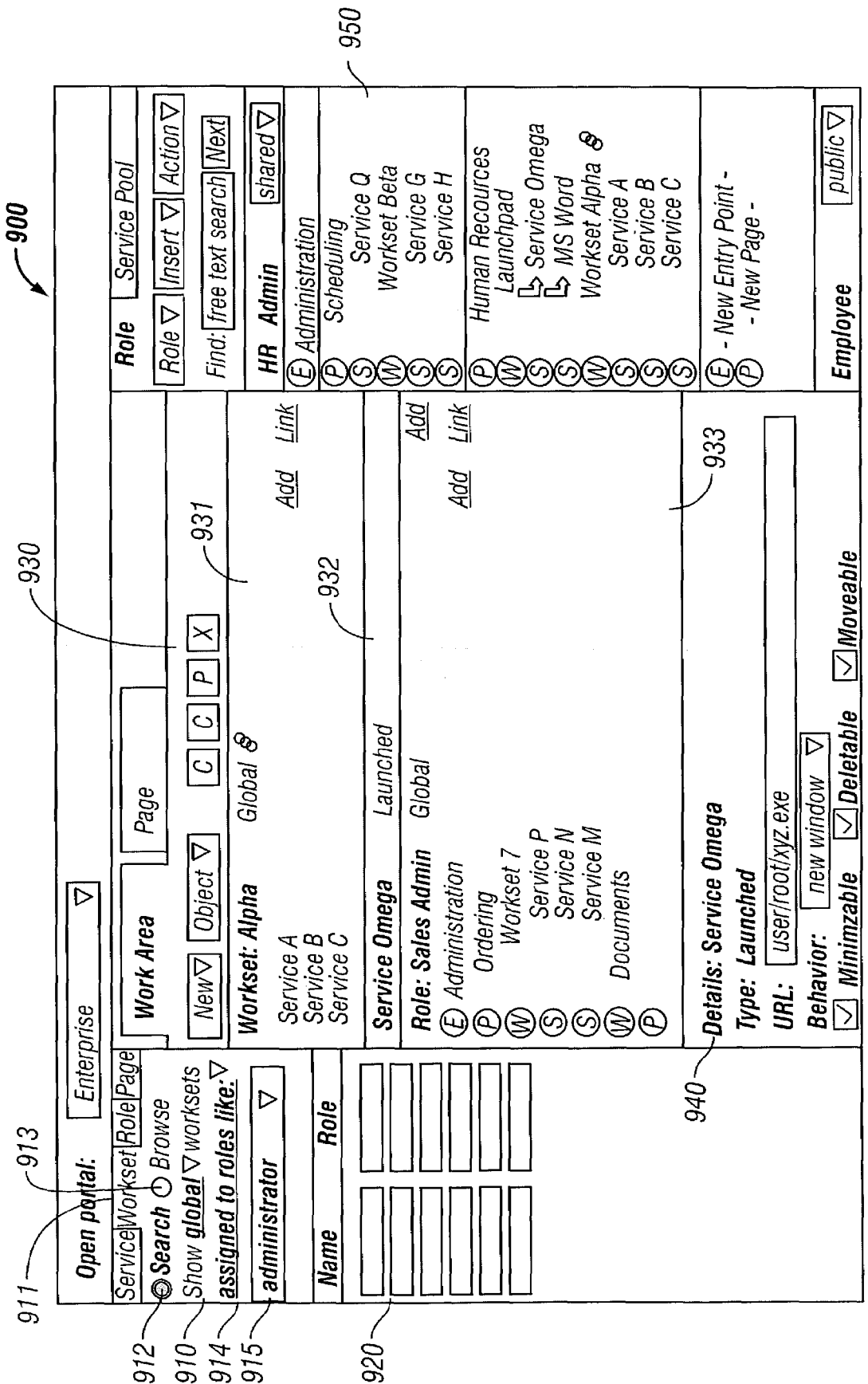
FIG. 9 is a representation of a workset development page.

Referring to FIG. 9, a user interface 900 for workset-based content administration is shown. User interface 900 may be used for assigning worksets to a user profile for a new employee with a job role of "HR Administrator." In a first area 910, a developer or other user may choose between different sources of available content for a new role or workset by choosing one of the tabs in a tab structure 911. For example, the user may choose to search among worksets by selecting the "Workset" tab. Other available tabs in a tab structure 911 include a service tab, a role tab, ad a page tab. A user may choose either a search function 912 or a browse function 913.

A user may choose to search for worksets that are assigned to particular job roles. In FIG. 9, a user has chosen to search for worksets that are assigned to roles like "administrator" by choosing the "assigned to roles like" choice from a drop-down menu 14, and an "administrator" role from a drop-down menu 915. Alternately, a user may choose other options, such as a search by workset name or other search.

A search by job role may produce one or more worksets associated with one or more job roles. The job roles and associated worksets may be displayed in a search display area 920. One or more worksets may be selected from search display area 920. In FIG. 9, a user has selected a "Workset Alpha" associated with a "Sales Administrator" role.

A work area 930 is provided for assigning and/or modifying content. Work area 930 includes a first area 931 including a representation of Workset Alpha, which includes Service A, Service B, and Service C. Work area 930 includes a second area 932 including a representation of a service Omega which is also assigned to the Sales Administrator role. Work area 930 includes a third area 933 including a representation of the "Sales Administrator" role.

A detail area 940 includes details about service Omega. The details include the type of service (here, "launched"), the URL of the service, how the service should be displayed by the portal (here, a new window will be created), and whether the window can be minimized, deleted, or moved. The user may modify the content in area 930 and/or assign it to a user profile.

Assignment area 950 shows content that is assigned to the user profile. Here, a number of worksets and services, including service Q, workset Beta (which includes services G and H), and Workset Alpha have been assigned to the user profile of the HR Administrator.

As illustrated by user interface 900, workset-based content administration provides for efficient and flexible development and maintenance of a workset-based portal system. Rather than developing entire roles for individual users, worksets (or parts of worksets) may be re-assigned to many users. Once a comprehensive workset-based portal system is in place, new worksets need only be developed when new work roles are created. Even then, portions of existing worksets may be used in creating a new workset directed to a particular new work role.

Figure 10A:
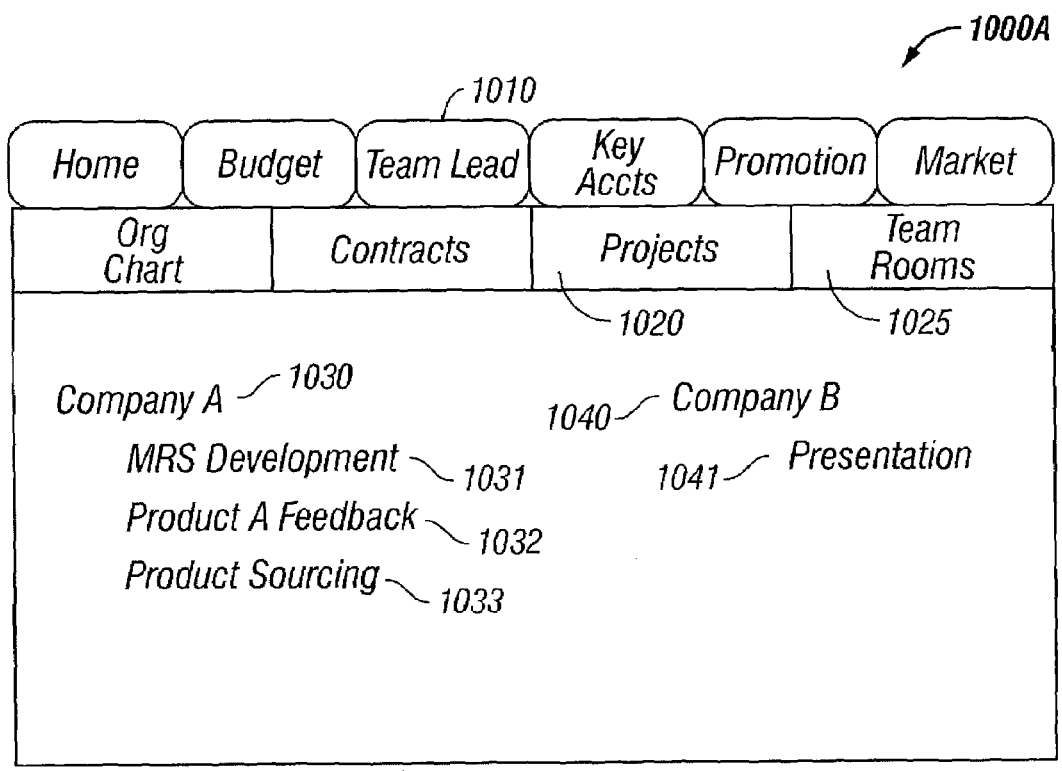
FIGS. 10A and 10B are representations of different workspace pages, each having a task linked to a collaborative space.
Figure 10B:
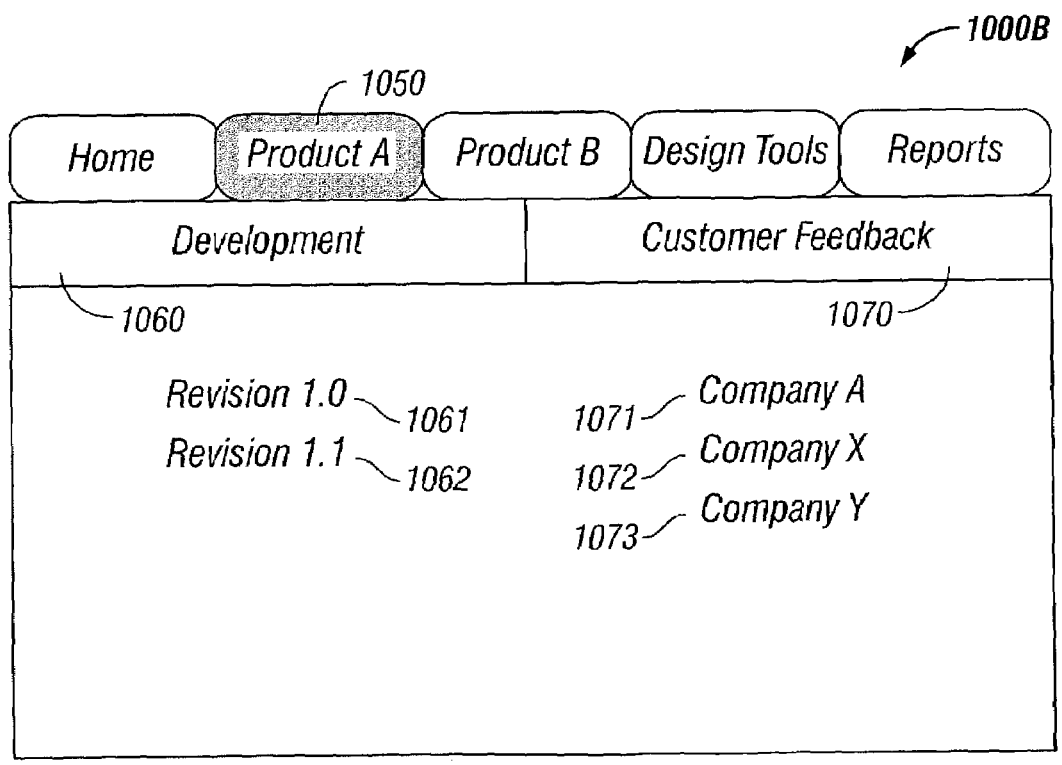

Referring to FIGS. 10A and 10B, worksets may be used for collaboration among employees. A workspace 1000A for a sales manager may include a team lead workset 1010. Team lead workset 1010 includes a projects task 1020, which includes a Company A task 1030 and a Company B task 1040. Company A task includes a MRS (i.e., Marketing Requirements Specification) task 1031, a Product A Feedback task 1032, and a product sourcing task 1033. Company B task 1040 includes a presentation task 1041. In this implementation, Company A may be a current customer and Company B may be a prospective customer.

Certain tasks in workspace 1000A may be collaborative. For example, Product A Feedback task 1032 may involve collaboration between the sales manager and others. Referring to FIG. 10B, an implementation of a workspace 1000B for a product support engineer is shown. Workspace 1000B includes a Product A workset 1050, including a development task 1060 and a customer feedback task 1070. Development task 1060 includes a Revision 1.0 task 1061 and a Revision 1.1 task 1062. Customer Feedback task 1070 includes a Company A task 1071, a Company X task 1072, and a Company Y task 1073. Selecting Product A Feedback task 1032 of FIG.

7A and Company A task 1071 of FIG. 10B may bring the sales manager and the product support engineer to the same workspace, including further tasks related to Company A feedback related to Product A. For example, the page may be a team or collaborative room, which may include tasks related to feedback data (e.g., Company A requests for software support), tasks related to collaboration (e.g., web meeting services, requests for comments), tasks related to customer communication (e.g., Company A contacts), and other tasks. Collaborative content may also be collected in a collaborative workspace such as a workspace associated with team rooms task 1025 of FIG. 10A.

Figure 11:
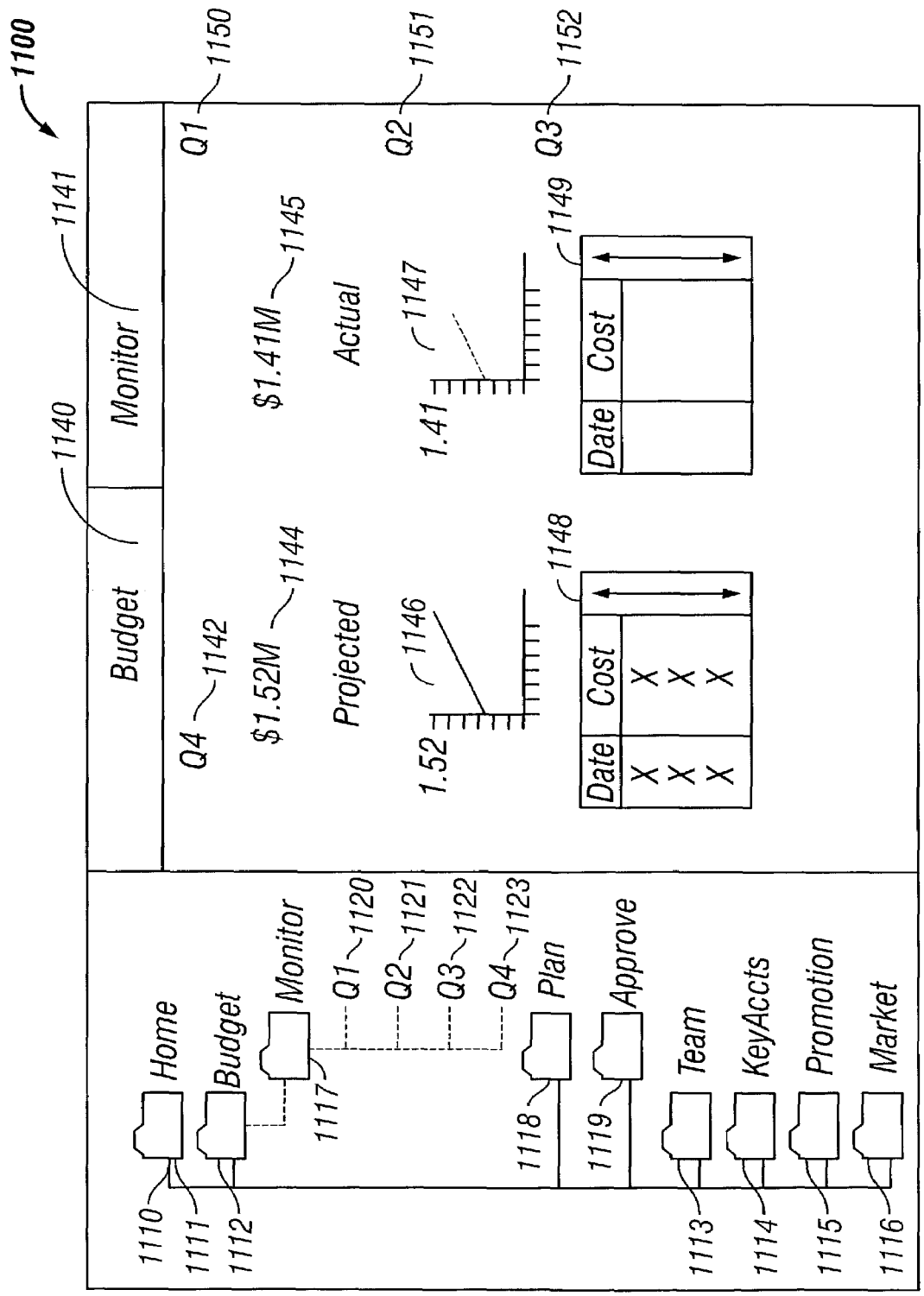
FIG. 11 is an alternate representation of a workspace page for a user with a role of sales manager.

Referring to FIG. 11, other workspace designs may be used to present worksets and tasks to users. A workspace 1100 may be used to present worksets and tasks similar to those presented in workspace 600 of FIG. 6 and monitor task page 700 of FIG. 7. Workspace 1100 includes an expandable file list 1110 including a home page 1111, a budget workset 1112, a team workset 1113, a key accounts workset 1114, a promotion workset 1115, and a market workset 1116.

Budget workset 1112 includes a monitor task 1117, a plan task 1118, and an approve task 1119. Monitor task 1117 includes a Q1 task 1120, a Q2 task 1121, a Q3 task 1122, and a Q4 task 1123, which has been selected.

Workspace 1100 includes a presentation area 1140 with a first title space 1141 indicating the workset name and first level task name. A second title space 1142 includes a second level task name. Area 1140 includes a projected budget amount task 1144, an actual budget amount task 1145, a project budget graph task 1146, an actual budget graph task 1147, a projected budget data task 1148, and an actual budget data task 1149. Each task may be presented in an Iview. Area 1140 includes a user-selectable link 1150 to Q1 task 1120, a user-selectable link 1151 to Q2 task 1121, and a user-selectable link 1152 to Q3 task 1122. Many other presentations may be used. Generally, an effective presentation of a workspace provides for efficient navigation and ease of use among logically arranged worksets, tasks, and generic portal pages.

Figure 12:
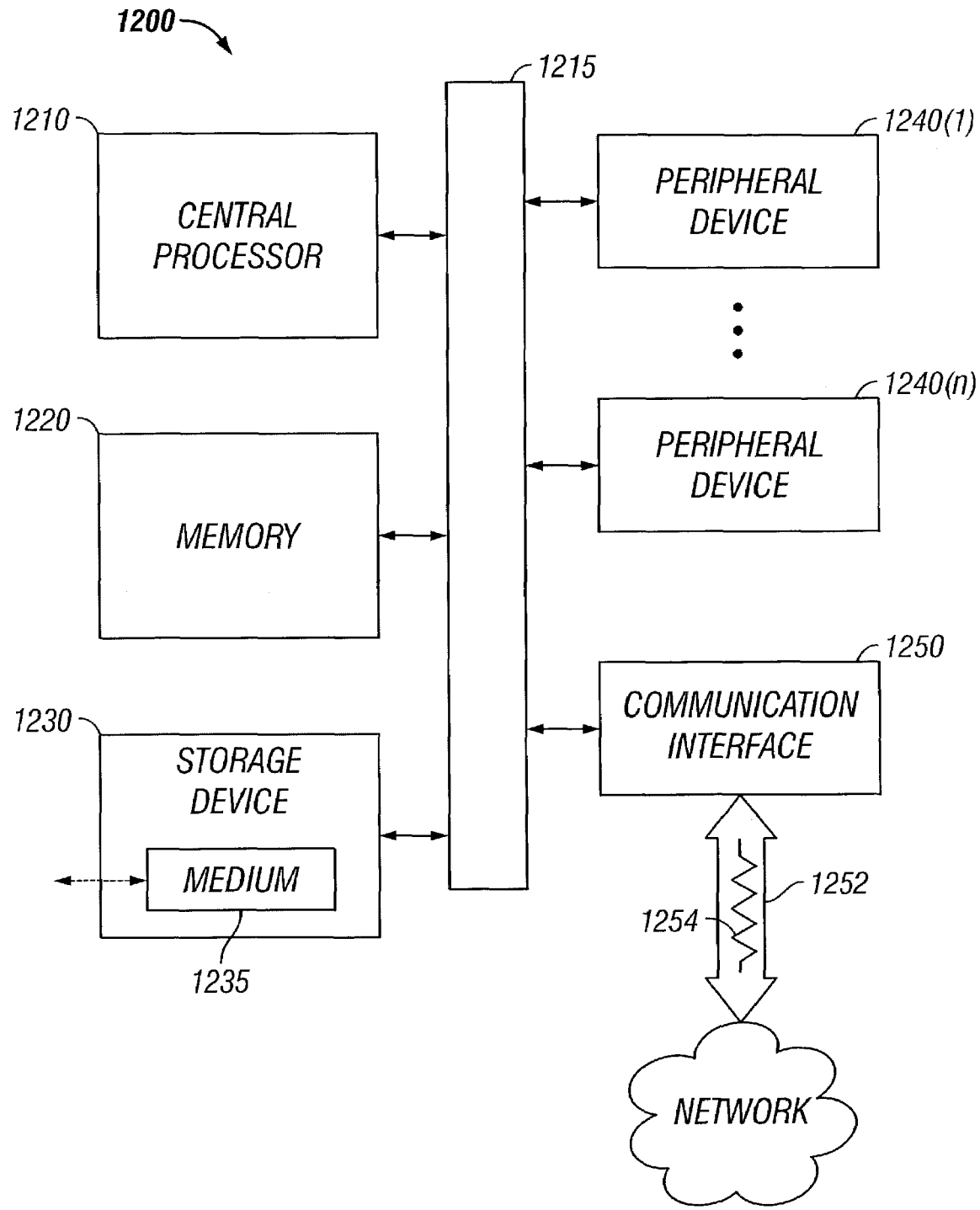
FIG. 12 is a block diagram illustrating an example data processing system.

Data for roles, worksets, and tasks may be processed using one or more data processing systems. FIG. 12 is a block diagram illustrating an example data processing system 1200. The data processing system 1200 includes a central processor 1210, which executes programs, performs data manipulations and controls tasks in the system 1200. The central processor 1210 is coupled with a bus 1215 that can include multiple busses, which may be parallel and/or serial busses.

The data processing system 1200 includes a memory 1220, which can be volatile and/or non-volatile memory, and is coupled with the communications bus 1215. The system 1200 can also include one or more cache memories. The data processing system 1200 can include a storage device 1230 for accessing a medium 1235, which may be removable, read-only or read/write media and may be magnetic-based, optical-based, semiconductor-based media, or a combination of these. The data processing system 1200 can also include one or more peripheral devices 1240(*l*)-1240(*n*) (collectively, devices 1240), and one or more controllers and/or adapters for providing interface functions.

The system 1200 can further include a communication interface 1250, which allows software and data to be transferred, in the form of signals 1254 over a channel 1252, between the system 1200 and external devices, networks or information sources. The signals 1254 can embody instructions for causing the system 1200 to perform operations. The system 1200 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 1200 and/or delivered to the machine 1200 over a communication interface. These instructions, when executed, enable the machine 1200 to perform the features and function described above. These instructions represent controllers of the machine 1200 and can be implemented in a high-level procedural and/or object-oriented programming language, and/or in assembly/machine language. Such languages can be compiled and/or interpreted languages.

As used herein, the term "machine-readable medium" refers to any computer program product, apparatus and/or device used to provide machine instructions and/or data to the machine 1200, including a machine-readable medium that receives machine instructions as a machine-readable signal. Examples of a machine-readable medium include the medium 1235, the memory 1220, and/or PLDs, FPGAs, ASICs, and the like. The term "machine-readable signal" refers to any signal, such as the signals 1254, used to provide machine instructions and/or data to the machine 1200.

Figure 13:
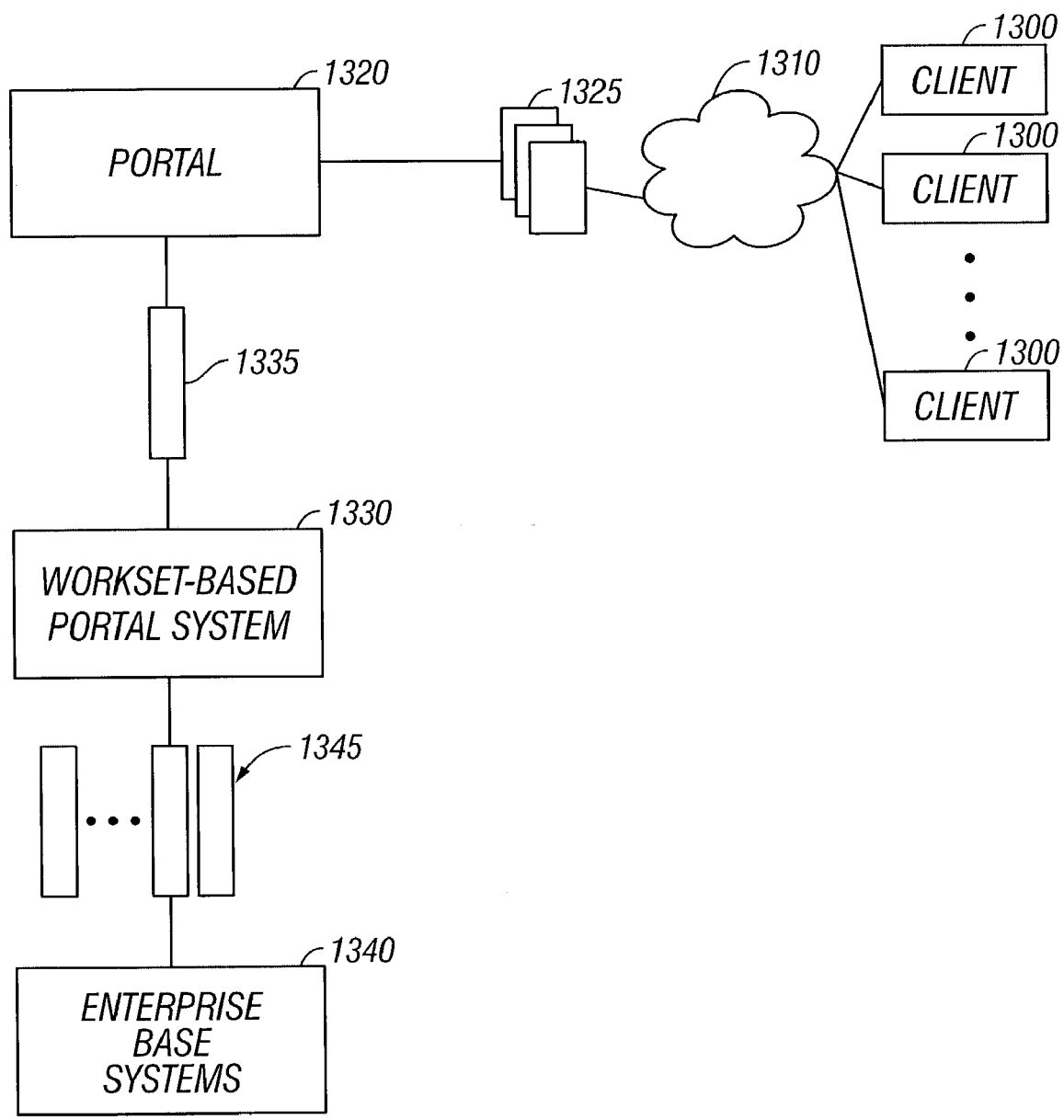
FIG. 13 is a block diagram illustrating an example workset-based portal system.

FIG. 13 is a block diagram illustrating an example workset-based portal system. Users of client devices 1300 can access data over a network 1310 through a portal 1320. The network 1310 can be any communication network linking machines capable of communicating using one or more networking protocols. The network 1310 can be a local area network (LAN), metropolitan area network (MAN), wide area network (WAN), enterprise network, virtual private network (VPN), the Internet, etc. The clients 300 can be any machines or processes capable of communicating over the network 1310. The client devices 1300 can be Web Browsers and can be communicatively coupled with the network 1310 through a proxy server.

The portal 1320 provides a common interface to program management services. The portal 1320 receives requests from the client devices 1300 and generates data views 1325 (e.g., Web pages) in response. The portal 1320 can implement a workset-based system to personalize the common interface and the data views 1325 for a user of a client device 1300. A user has one or more associated worksets that allow personalized tailoring of a presented interface through the generated data views 1325.

The portal 1320 communicates with a workset system 1330 that consolidates multiple application services. The portal 1320 receives data 1335 from the workset system 1330 for use in fulfilling the requests from the client devices 1300. The workset system 1330 provides integrated application services and other resources to enable efficient user workflow.

The workset system 1330 communicates with enterprise base systems 1340 to obtain multiple types of data 1345. The enterprise base systems 1340 can include various existing application services, such as human resource management systems, financial management systems, project management systems, time management systems, and electronic file and/or mail systems. The workset system 1330 can consolidate and integrate the data and functionality of such systems into a single tool.

The portal 1320, workset system 1330 and enterprise base systems 1340 can reside in one or more programmable machines, which can communicate over a network or one or more communication busses. For example, the base systems 1340 can reside in multiple servers connected to an enterprise network, and the portal 1320 and the workset system 1330 can reside in a server connected to a public network. Thus, a user of the system can access and manage resources through a single portal from anywhere that access to a public network is available.

Although only a few embodiments have been described in detail above, other modifications are possible. Portions of this disclosure discuss presentations for roles, worksets, and associated tasks. Different presentations may be used. Further, although the current specification uses the term "workset" to a top level grouping of tasks that may be associated with a role, the terms may be used differently. For example, rather than a workset and one or more task levels, one or more workset levels may be used, and the term task may refer to the lowest level action.

The logic flow depicted in FIG. 3 does not require the particular order shown, or sequential order, to achieve desirable results. For example, an employee workflow structure may be determined before particular worksets are developed, based on the employee's responsibilities. Employee activities may be determined at many different places within the overall process. Further, in certain implementations, multitasking and parallel processing may be preferable.

Other embodiments may be within the scope of the following claims.

What is claimed is:

1. A data object embedded in a computer readable storage medium and executable by one or more processors for performing a work role, said data object comprising:
   workset description data for the work role, the workset description data including:
      task data associated with performing the work role, wherein the work role comprises a set of tasks and responsibilities directed to achieving a particular work goal;
      portal environment data for performing the work role and presenting information to a user via a portal; and
      data specifying state-less information and state-full information for performing the work role, wherein the data for the state-less information comprises portal services and user interface elements, and the data for the state-full information comprises a current state of a working process; and
   meta-data descriptive of the work role.

2. The data object of claim 1, wherein the task data includes data associated with one or more application programs for performing the work role.

3. The data object of claim 1, wherein the task data includes data associated with one or more documents for performing the work role.

4. The data object of claim 1, wherein the task data includes data associated with one or more life and work events for performing the work role.

5. The data object of claim 1, wherein the portal environment data includes one or more of navigation data, view data, and page data.

6. The data object of claim 1, wherein the meta-data includes one or more of community data, collaboration data, context data, job role data, subscription data, taxonomy data, user data, and search domain data.

7. The data object of claim 1, wherein the meta-data includes data for populating a generic portal page with content.

8. A method comprising:
   assigning a data object to a user profile for a portal user, the data object including workset description data for a work role of the user, the workset description data including meta-data descriptive of the work wherein the work role comprises a set of tasks and responsibilities directed to achieving a particular work goal, and data specifying state-less information and state-full information for performing the work roles, wherein the data for the state-less information comprises portal services and user interface elements, and the data for the state-full information comprises a current state of a working process;

copying at least some meta-data of the data object to the user profile; and personalizing the user's portal environment using the copied meta-data.

9. The method of claim 8, wherein personalizing includes activating a subscription for the user.

10. The method of claim 8, wherein personalizing includes activating a membership in a community for the user.

11. The method of claim 8, wherein personalizing includes displaying personalized information to the user, wherein the personalized information is related to the particular work role.

12. An article comprising a machine-readable medium storing instructions operable to cause one or more machines to perform a method comprising:

assigning a data object to a user profile for a portal user, the data object including workset description data for a work role, the workset description data including meta-data descriptive of the work role, wherein the work role comprises a set of tasks and responsibilities directed to achieving a particular work goal, and data specifying state-less information and state-full information for performing the work role, wherein the data for the state-less information comprises portal services and user interface elements, and the data for the state-full information comprises a current state of a working process;

copying at least some meta-data of the data object to the user profile; and personalizing the user's portal environment using the copied meta-data.

13. The article of claim 12, wherein personalizing includes activating a subscription for the user.

14. The article of claim 12, wherein personalizing includes activating a membership in a community for the user.

15. The article of claim 12, wherein personalizing includes displaying personalized information to the user, wherein the personalized information is related to the particular work role.

16. A system comprising:

a processor;

a memory;

means for assigning a data object to a user profile for a portal user, the data object including workset description data for a work role, the workset description data including meta-data descriptive of the work role, wherein the work role comprises a set of tasks and responsibilities directed to achieving a particular work goal, and data specifying state-less information and state-full information for performing the work role, wherein the data for the state-less information comprises portal services and user interface elements, and the data for the state-full information comprises a current state of a working process;

means for copying at least some meta-data of the data object to the user profile; and means for personalizing the user's portal environment using the copied meta-data.

17. The system of claim 16 wherein the means for personalizing further activates a subscription for the user.

18. The system of claim 16 wherein the means for personalizing further activates a membership in a community for the user.

19. The system of claim 16 wherein the means for personalizing further displays personalized information related to the particular work role.

20. An article comprising a machine-readable medium storing instructions operable to cause one or more machines to perform operations according to a method, the method comprising:

storing a plurality of data objects, each data object associated with a workset for a work role, wherein the work role comprises a set of tasks and responsibilities directed to achieving a particular work goal, and the workset further includes data specifying state-less information and state-full information for performing the work role, wherein the data for the state-less information comprises portal services and user interface elements, and the data for the state-full information comprises a current state of a working process;

storing meta-data descriptive of the work role with the data objects;

storing a plurality of user profiles, each user profile associated with a particular user of a portal system;

assigning one or more of the data objects to each of the plurality of user profiles; and generating one or more portal pages associated with each of the data objects, the one or more portal pages including user interface elements for performing the particular work role.

21. The article of claim 20, wherein each of the data objects includes task data associated with performing the particular work role.

22. The article of claim 20, wherein each of the data objects further includes portal environment data for generating the one or more portal pages.

23. The article of claim 20, wherein each of the user profiles includes meta-data from an assigned one of the data objects.

24. A system comprising:

a processor;

a memory;

means for storing a plurality of data objects, each data object associated with a workset for a work role, wherein the work role comprises a set of tasks and responsibilities directed to achieving a particular work goal, and the workset further includes data specifying state-less information and state-full information for performing the work role, wherein the data for the state-less information comprises portal services and user interface elements, and the data for the state-full information comprises a current state of a working process;

means for storing meta-data descriptive of the work role with the data objects;

means for storing a plurality of user profiles, each user profile associated with a particular user of a portal system;

means for assigning one or more of the plurality of data objects to each of the plurality of user profiles; and means for generating one or more portal pages associated with each of the data objects, the one or more portal pages including user interface elements for performing the work role.

25. The system of claim 24, wherein each of the data objects includes task data, associated with performing the particular work role.

26. The system of claim 24, wherein each of the data objects further includes portal environment data for generating the one or more portal pages.

27. The system of claim 24, wherein each of the plurality of user profiles includes meta-data from an assigned one of the data objects.

* * * * *